(12) United States Patent
Beasley

(10) Patent No.: US 11,034,040 B2
(45) Date of Patent: Jun. 15, 2021

(54) CUTLERY APPARATUS

(71) Applicant: Dorothy Louise Beasley, Patricia (CA)

(72) Inventor: Dorothy Louise Beasley, Patricia (CA)

( * ) Notice: Subject to any disclaimer, the term of this patent is extended or adjusted under 35 U.S.C. 154(b) by 295 days.

(21) Appl. No.: 16/191,366

(22) Filed: Nov. 14, 2018

(65) Prior Publication Data

US 2020/0147820 A1 May 14, 2020

(51) Int. Cl.
| | | |
|---|---|---|
| *A23N 7/00* | (2006.01) | |
| *B26D 3/28* | (2006.01) | |
| *B26D 7/26* | (2006.01) | |
| *B26D 7/22* | (2006.01) | |
| *A47J 17/02* | (2006.01) | |
| *A01D 45/02* | (2006.01) | |
| *A01F 11/06* | (2006.01) | |
| *B26D 7/00* | (2006.01) | |

(52) U.S. Cl.
CPC ........... *B26D 3/283* (2013.01); *A01D 45/026* (2013.01); *A01F 11/06* (2013.01); *A47J 17/02* (2013.01); *B26D 7/22* (2013.01); *B26D 7/2614* (2013.01); *B26D 7/2628* (2013.01); *B26D 2007/0018* (2013.01); *B26D 2210/02* (2013.01)

(58) Field of Classification Search
CPC ....... A01F 11/06; A01D 45/02; A01D 45/026; A01D 45/021; A23N 5/00; A23N 7/00
USPC ...... 99/567, 537, 539; 30/121.5; 460/48, 51, 460/52, 53, 54, 55, 57
See application file for complete search history.

(56) References Cited

U.S. PATENT DOCUMENTS

| | | | | |
|---|---|---|---|---|
| 159,741 | A * | 2/1875 | Barker | A01F 11/06 |
| 298,937 | A * | 5/1884 | Blue | A01F 11/06 |
| 1,024,240 | A * | 4/1912 | Wood | A01F 11/06 |
| 6,644,180 | B1 * | 11/2003 | Ward | A47J 25/00 |
| 6,729,228 | B2 * | 4/2004 | Thomas | 99/567 |
| 2018/0343804 | A1 * | 12/2018 | Hetrich et al. | A01F 11/06 |

\* cited by examiner

*Primary Examiner* — Reginald Alexander
(74) *Attorney, Agent, or Firm* — Gulf Coast Intellectual Property Group

(57) ABSTRACT

A cutlery apparatus that is configured to provide efficient removal of corn kernels from a corn cob. The cutlery apparatus includes a support member that is planar in manner having an upper surface and a perimeter edge. A first brace member and a second brace member are mounted to the upper surface of the support member and further include a void therebetween. The first brace member and second brace member are parallel to each other and angularly oriented on the support member. A cutting member is provided wherein the cutting member has a first portion disposed within the void and a second portion extending beyond the perimeter edge of the support member. The second portion of the cutting member is a metal blade. A clamp member extends across the void and is movably secured to the first brace member and second brace member.

13 Claims, 4 Drawing Sheets

US 11,034,040 B2

CUTLERY APPARATUS

FIELD OF THE INVENTION

The present invention relates generally to a food preparation device, more specifically but not by way of limitation, a cutlery apparatus that is operable to provide removal of corn kernels from a corn cob for subsequent preparation and/or consumption.

BACKGROUND

Food preparation is performed by numerous individuals on a daily basis. Whether it is for an individual meal or for commercial production various types of apparatus are utilized to prepare different types of food items. Conventional apparatus such as but not limited to knives and other tools are utilized to prepare numerous types of food items.

Various types of food items require specialized tools to perform a desired task. Pasta cutters have been developed to cut ravioli and numerous other examples exist wherein a kitchen preparation tool has been developed to accomplish a desired task. One exemplary type of food item for which specialized tools have been developed is corn. Corn has a unique structure with a solid center cob with kernels surroundably present thereon. Accessories such as but not limited to corn cob holders have been developed wherein the holders are inserted into the ends of the cob and allow a person to engage the cob and eat the kernels directly from the cob. This task can be difficult for those with dental apparatus or many find it an undesirable to eat corn in this manner. Furthermore, for many recipes, removal of the kernel is required. Removal of kernels from a corn cob can be challenging with conventional cutlery.

Accordingly, there is a need for a cutlery apparatus that is configured to provide efficient and safe removal of corn kernels from a corn cob.

SUMMARY OF THE INVENTION

It is the object of the present invention to provide a cutlery apparatus that is configured to remove corn kernels from a corn cob wherein the present invention includes a support surface that is configured to have a corn cob superposed thereon.

Another object of the present invention is to provide a corn cob cutting device that is operable to assist in the removal of corn kernels from a corn cob wherein the present invention includes a first brace member wherein the first brace member is superposed the support surface and proximate a corner thereof.

A further object of the present invention is to provide a cutlery apparatus that is configured to remove corn kernels from a corn cob wherein the present invention that further includes a second brace member that is superposed the support surface proximate the first brace member and generally parallel thereto.

Still another object of the present invention is to provide a corn cob cutting device that is operable to assist in the removal of corn kernels from a corn cob wherein the present invention includes a void intermediate the first brace member and the second brace member.

An additional object of the present invention is to provide a cutlery apparatus that is configured to remove corn kernels from a corn cob wherein the present invention that includes a cutting member wherein the cutting member includes a first portion and a second portion wherein the first portion is releasably secured within the void intermediate the first brace member and the second brace member.

Yet a further object of the present invention is to provide a corn cob cutting device that is operable to assist in the removal of corn kernels from a corn cob wherein the present invention wherein the second portion of the cutting member is a blade wherein the blade extends outward from the peripheral edge of the support surface and is angular thereto.

Another object of the present invention is to provide a cutlery apparatus that is configured to remove corn kernels from a corn cob wherein the present invention that further includes a clamp member wherein the clamp member is operable to extend intermediate the first brace member and the second brace member so as to assist in the retention of the first portion of the cutting member within the void intermediate the first brace member and second brace member.

An alternate object of the present invention is to provide a corn cob cutting device that is operable to assist in the removal of corn kernels from a corn cob wherein the present invention that further includes an optional container wherein the container is configured to receive kernels as the kernels are cut from the corn cob.

Still a further object of the present invention is to provide a a cutlery apparatus that is configured to remove corn kernels from a corn cob wherein the present invention that further includes an optional cutting member guard wherein the guard is configured to protect a user's hands from the second portion of the cutting member while allowing the blade to remove the kernels from the corn cob.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
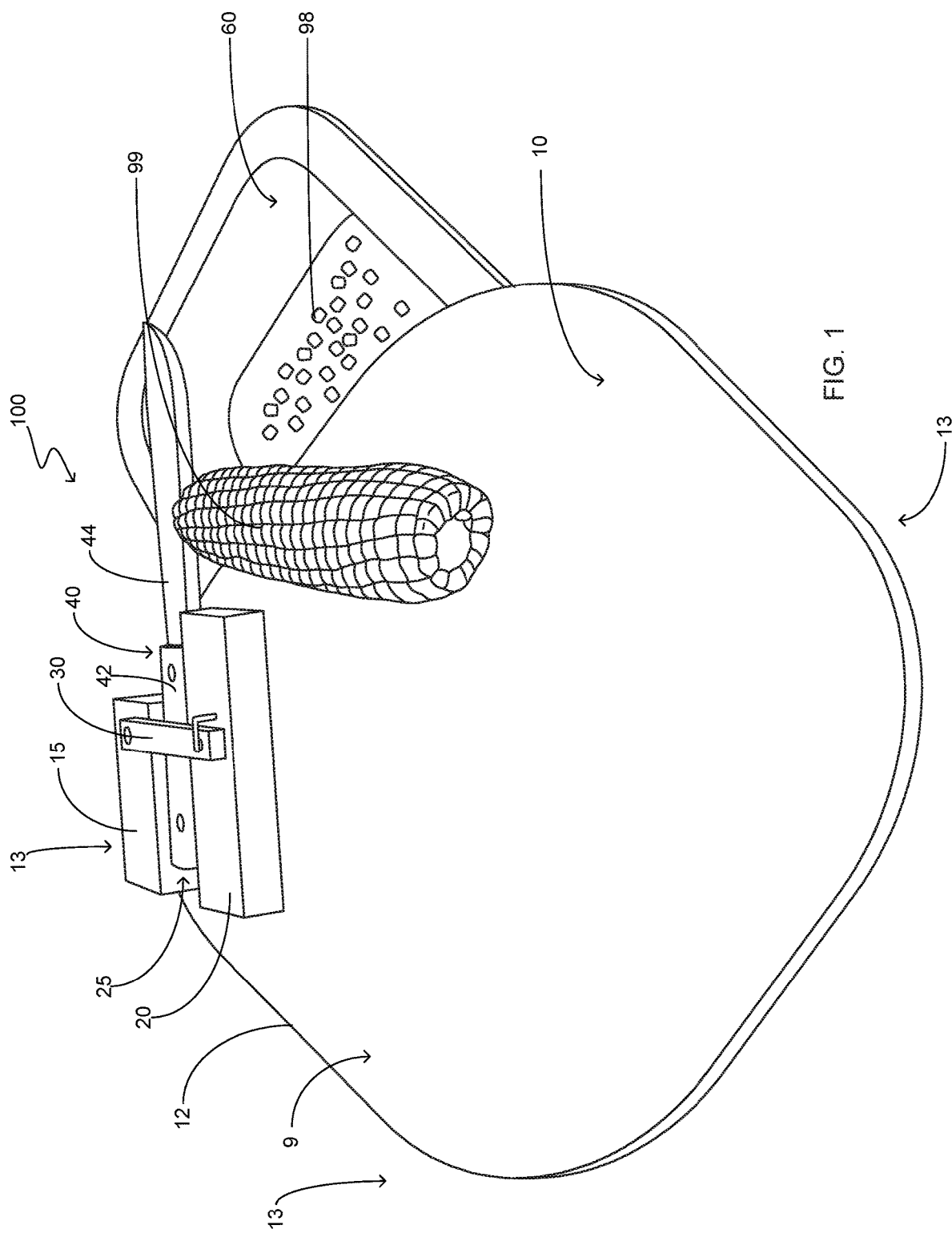
FIG. 1 is a perspective view of the present invention.
Figure 2:
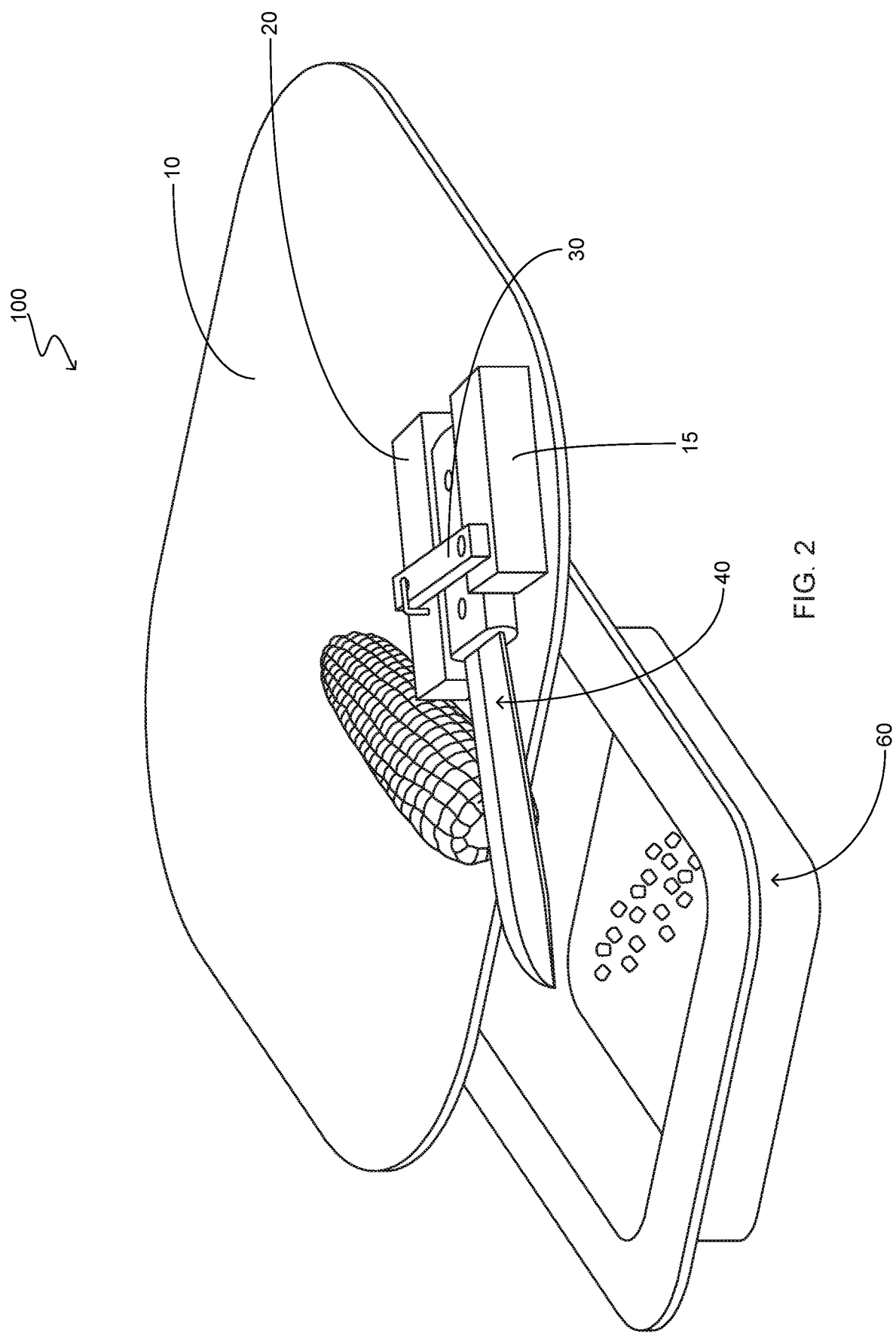
FIG. 2 is a side perspective view of the present invention.

Referring now to the drawings submitted herewith, wherein various elements depicted therein are not necessarily drawn to scale and wherein through the views and figures like elements are referenced with identical reference numerals, there is illustrated a cutlery apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring to the Figures herein, the cutlery apparatus 100 includes a support member 10. The support member 10 is manufactured from a durable rigid material such as but not limited to wood or plastic. The support member 10 is planar in manner and is configured to be superposed a suitable horizontal support surface such as but not limited to a kitchen counter or table. The support member 10 is formed in a shape so as to have a plurality of corners 13. While the support member 10 is illustrated herein as being square in shape with rounded corners, it is contemplated within the scope of the present invention that the support member 10 could be manufactured in numerous shapes and sizes. The support member 10 is of suitable size to receive an exemplary corn cob 99 thereon. The support member 10 includes perimeter edge 12.

A first brace member 15 is secured to the upper surface 9 of the support member 10. The first brace member 15 is mounted adjacent to a corner 13 and is parallel with the second brace member 20. The first brace member 15 and second brace member 20 are manufactured from a suitable durable rigid material such as but not limited to wood or plastic. The first brace member 15 and second brace member 20 are positioned to be parallel with respect to each other and have a void 25 therebetween. The void 25 as will be further discussed herein is of suitable size to accommodate the first portion 42 of the cutting member 40. The first brace member 15 and second brace member 20 are proximate a corner and are further angularly mounted to the upper surface 9 of the support member 10. The angular position of the first brace member 15 and second brace member 20 is configured so as to place the cutting member 40 specifically the second portion 44 thereof at the required angle with respect to the perimeter edge 12 of the support member 10.

The first brace member 15 and second brace member 20 combine to provide the required leverage needed to stabilize the cutting member 40 when an exemplary corn cob 99 is being cut utilizing the cutlery apparatus 100. The first brace member 15 is manufactured to a length that is shorter than that of the second brace member 20 so as to allow for placement proximate to corner 13. It is contemplated within the scope of the present invention that the first brace member 15 and second brace member 20 could be manufactured of the same length and size. Furthermore, it is contemplated within the scope of the present invention that the cutlery apparatus 100 could include only one brace member wherein in such a configuration the second portion 42 of the cutting member 40 could employ additional mechanical fasteners to secure to the support member 10.

A clamp member 30 is operably coupled to the first brace member 15 and second brace member 20. The clamp member 30 is movably coupled utilizing suitable fasteners in order to allow placement of the cutting member 40 into the void 25 and subsequently be positioned so as to extend thereacross. In the position wherein the clamp member 30 extends across void 25, the clamp member 30 is operable to inhibit upward movement of the second portion 42 of the cutting member 40. The clamp member 30 is manufactured from a suitable rigid material such as but not limited to wood or plastic. It is contemplated within the scope of the present invention that the clamp member 30 could be manufactured from numerous types of materials and be different sizes or styles and still achieve the desired objective described herein.

The cutting member 40 is configured to be releasably secured to the support member 10 and provide removal of the kernels from the exemplary corn cob 99. The cutting member 40 includes a first portion 42 integrally formed with a second portion 44. The second portion 44 is a blade manufactured from a suitable material such as but not limited to metal. The first portion 42 of the cutting member 40 is removably positioned within the void 25 wherein the aforementioned angular orientation of the first brace member 15 and second brace member 20 position the second portion 44 of the cutting member 40 at an angle wherein the corn cob 99 engages the second portion 44 at a position wherein the kernels 99 being removed are beyond the perimeter edge 12 of the support member 10. This angular position of the cutting member 40 facilitates the deposit of kernels 98 into a suitable receptacle and inhibit the kernels from gathering on the upper surface 9 of the support member 10 during cutting of a corn cob. It should be understood within the scope of the present invention that the cutting member 40 could be a conventional knife or other suitable cutting apparatus.

The cutting member 40 is vertically adjustable utilizing spacers 70. Spacers 70 are positioned in the void 25 on upper surface 9. First portion 42 of cutting member 40 is superposed spacers so as to position the second portion 44 of the cutting member 40 wherein the second portion is ideally located to cut the kernels from the cob 99. It is contemplated within the scope of the present invention that the cutlery apparatus 100 could employ as few as one spacer 70 or more than two spacers 70 so as to accomplish the aforementioned desired task. It is further contemplated within the scope of the present invention that the cutting member 40 could be designed so as to be able to be utilized without the need for spacers 70.

Receptacle 60 is positioned so as to receive cut kernels 98 subsequent being removed from a corn cob 99. It is contemplated within the scope of the present invention that the receptacle could be releasably secured to the support member 10 utilizing suitable techniques and could be provided in alternate sizes. It is further contemplated within the scope of the present invention that the cutlery apparatus 100 could be operated without the receptacle 60.

Figure 3:
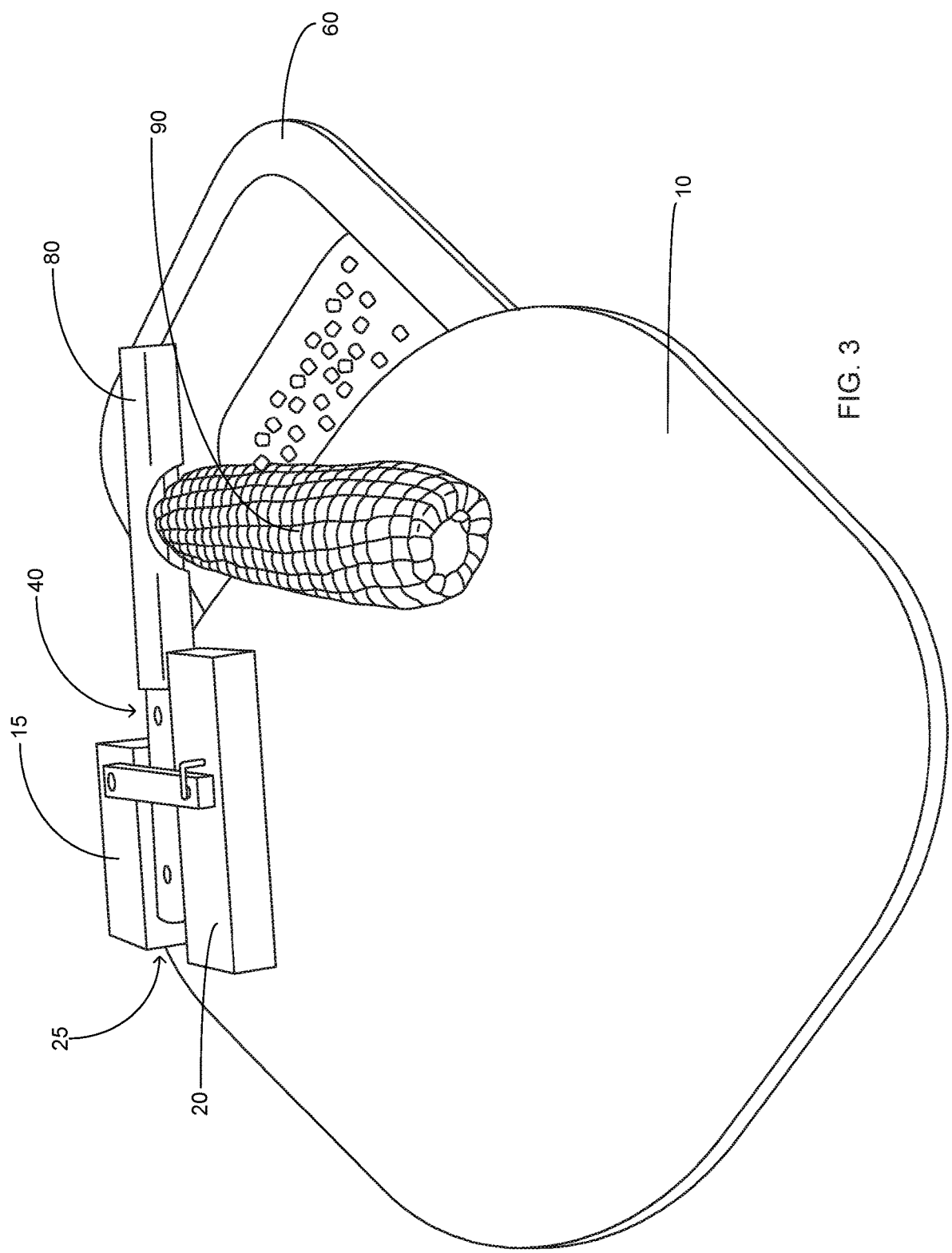
FIG. 3 is a perspective view of the present invention having a guard present on the cutting member.
Figure 4:
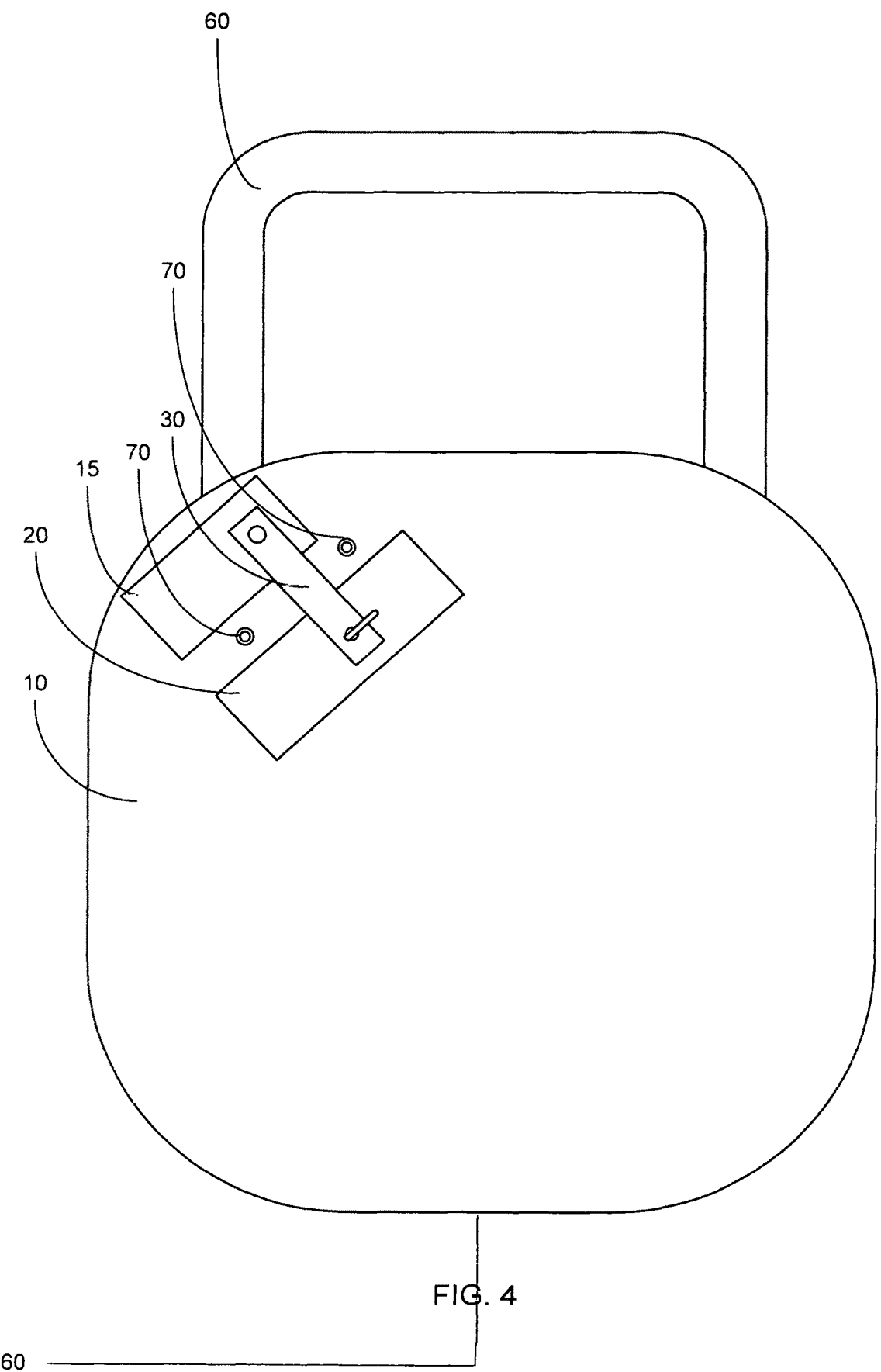
FIG. 4 is a top view of the present invention with the cutting member removed.

Illustrated herein in FIG. 3 is the guard member 80. Guard member 80 is operable to provide a safety feature during utilization of the cutlery apparatus 100. The guard member 80 illustrated herein is exemplary only and it is contemplated within the scope of the present invention that the guard member 80 could be constructed in alternate configurations. The guard member 80 is manufactured from a suitable material such as but not limited to plastic and is operable to provide coverage of all of the second portion 44 of the cutting member 40 with the exception of the portion engaged with the corn cob 99. Providing such a guard member 80 is intended to reduce potential contact with the second portion 44 of the cutting member 40 by a user's hand during operation of the cutlery apparatus 100.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A cutlery apparatus configured to cut kernels from a corn cob comprising:
    a support member, said support member having an upper surface, said support member having a perimeter edge, said perimeter edge defining a shape of said support member, said support member having a plurality of corners, said support member being of suitable size so as to have superposed thereon a corn cob;
    a first brace member, said first brace member being secured to said upper surface of said support member, said first brace member being proximate one of said plurality of corners;
    a second brace member, said second brace member being secured to said upper surface of said support member, said second brace member being proximate said first brace member, said second brace member being parallel to said first brace member;
    a cutting member, said cutting member having a first portion and a second portion, said first portion and said second portion of said cutting member being integrally formed, said second portion of said cutting member being a metal blade, wherein said second portion of said cutting member is positioned so as to extend beyond said perimeter edge of said support member;
    a void, said void being intermediate said first brace member and said second brace member, said void configured to receive therein the second portion of said cutting member; and
    a clamp member, said clamp member being movably secured to said first brace member, said clamp member configured to extend across said void, said clamp member configured to inhibit upward movement of said second portion of said cutting member.

2. The cutlery apparatus as recited in claim 1, and further including at least one spacer, said at least one spacer being intermediate said upper surface of said support member and said first portion of said cutting member, said at least one spacer operable to provide vertical adjustment of the cutting member.

3. The cutlery apparatus as recited in claim 2, and further including a receptacle, said receptacle being positioned underneath said support member and adjacent to the perimeter edge thereof, said receptacle configured to receive kernels from a corn cob engage with the cutlery apparatus.

4. The cutlery apparatus as recited in claim 3, and further including a guard member, said guard member operably coupled with said second portion of said cutting member, said guard member providing coverage of a portion of the second portion not engaged with a corn cob so as to inhibit contact with the second portion by a hand of a user of the cutlery apparatus.

5. The cutlery apparatus as recited in claim 4, wherein the second portion of the cutting member is angularly oriented with respect to the perimeter edge of the support member.

6. The cutlery apparatus as recited in claim 5, wherein the cutting member is a knife.

7. A cutlery apparatus configured to remove kernels from a corn cob comprising:
    a support member, said support member having an upper surface, said support member having a perimeter edge, said perimeter edge defining a shape of said support member, said support member having at least one corner, said support member being of suitable size so as to have superposed thereon a corn cob;
    at least one brace member, said at least one brace member being secured to said upper surface of said support member, said at least one brace member being proximate said at least one corner, said at least one brace member being angularly oriented with respect to said perimeter edge;
    a cutting member, said cutting member having a first portion and a second portion, said first portion and said second portion of said cutting member being integrally formed, said second portion of said cutting member being a metal blade, wherein said second portion of said cutting member is positioned so as to extend beyond said perimeter edge of said support member, wherein the cutting member is vertically adjustable with respect to said upper surface of said support member and wherein said cutting member further includes a guard member, said guard member configured to inhibit contact with a portion of the metal blade during use of the cutlery apparatus; and
    a receptacle, said receptacle releasably secured to said support member, said receptacle configured to receive kernels from the corn cob engaged with the cutlery apparatus.

8. The cutlery apparatus as recited in claim 7, wherein the cutting member is a knife.

9. A cutlery apparatus configured to provide efficient removal of corn kernels from a corn cob comprising:
    a support member, said support member being planar in manner, said support member having an upper surface, said support member having a perimeter edge, said perimeter edge defining a shape of said support member, said support member being square in shape with four rounded corners, said support member being of suitable size so as to have superposed thereon a corn cob;

a first brace member, said first brace member being secured to said upper surface of said support member, said first brace member being proximate one of said four rounded corners, said first brace member being angular in orientation with respect to said perimeter edge of said support member;

a second brace member, said second brace member being secured to said upper surface of said support member, said second brace member being proximate said first brace member, said second brace member being parallel to said first brace member;

a void, said void being intermediate said first brace member and said second brace member;

a cutting member, said cutting member having a first portion and a second portion, said first portion and said second portion of said cutting member being integrally formed, said first portion of said cutting member being disposed in said void, said second portion of said cutting member being a metal blade, wherein said second portion of said cutting member is positioned so as to extend beyond said perimeter edge of said support member;

at least one spacer, said at least one spacer being intermediate said upper surface of said support member and said first portion of said cutting member, said at least one spacer being located in said void intermediate the first brace member and the second brace member, said at least one spacer operable to provide vertical adjustment of the cutting member; and wherein said first brace member and said second brace member provide leverage against said first portion of said cutting member when a corn cob is engaged with said second portion of the cutting member.

10. The cutlery apparatus as recited in claim 9, and further including a receptacle, said receptacle being positioned underneath said support member and adjacent to the perimeter edge thereof, said receptacle configured to receive kernels from a corn cob engage with the cutlery apparatus.

11. The cutlery apparatus as recited in claim 10, wherein the second portion of the cutting member is angularly oriented with respect to the perimeter edge of the support member and extends beyond the perimeter edge.

12. The cutlery apparatus as recited in claim 11, and further including a guard member, said guard member operably coupled with said second portion of said cutting member, said guard member providing coverage of a portion of the second portion not engaged with a corn cob so as to inhibit contact with the second portion by a hand of a user of the cutlery apparatus.

13. The cutlery apparatus as recited in claim 12, wherein the cutting member is a knife.

\* \* \* \* \*